(12) United States Patent  
Vrhel

(10) Patent No.: US 8,488,195 B2  
(45) Date of Patent: Jul. 16, 2013

(54) SYSTEM AND METHOD FOR IMPROVING COLOR MANAGEMENT OF COLOR SPACES IN ELECTRONIC DOCUMENTS

(75) Inventor: Michael J. Vrhel, Sammamish, WA (US)

(73) Assignee: Artifex Software Inc., San Rafael, CA (US)

( * ) Notice: Subject to any disclaimer, the term of this patent is extended or adjusted under 35 U.S.C. 154(b) by 303 days.

(21) Appl. No.: 13/081,449

(22) Filed: Apr. 6, 2011

(65) Prior Publication Data

US 2011/0242562 A1  Oct. 6, 2011

Related U.S. Application Data

(60) Provisional application No. 61/321,469, filed on Apr. 6, 2010.

(51) Int. Cl.  
*H04N 1/60* (2006.01)

(52) U.S. Cl.  
USPC .......................... 358/1.9; 358/518; 358/523

(58) Field of Classification Search  
None  
See application file for complete search history.

(56) References Cited

U.S. PATENT DOCUMENTS

| | | | | |
|---|---|---|---|---|
| 6,603,879 B2* | 8/2003 | Haikin et al. | | 382/167 |
| 7,605,823 B2* | 10/2009 | Stokes et al. | | 345/589 |
| 7,612,926 B2* | 11/2009 | Jodra et al. | | 358/518 |
| 7,869,088 B2* | 1/2011 | Qiao | | 358/1.9 |
| 8,009,325 B1* | 8/2011 | Borg | | 358/1.9 |
| 8,102,569 B1* | 1/2012 | Goel et al. | | 358/2.1 |
| 2005/0200869 A1* | 9/2005 | Hayaishi | | 358/1.9 |
| 2008/0212113 A1* | 9/2008 | Kim | | 358/1.9 |
| 2010/0239275 A1* | 9/2010 | Yamade | | 399/39 |
| 2010/0245867 A1* | 9/2010 | Murata | | 358/1.9 |

\* cited by examiner

*Primary Examiner* — Dung Tran  
(74) *Attorney, Agent, or Firm* — O'Melveny & Myers LLP

(57) ABSTRACT

A system and method is provided for improving color management of DeviceN color spaces in an electronic document. In one embodiment of the present invention, the system includes a memory device for storing a plurality of ICC profiles, and a rendering application operating on a computer, wherein each ICC profile includes a plurality of colorant names and an order in which they are laid down during a reproduction process. The rendering application is configured to render a document having at least one DeviceN color space so that it can be accurately displayed on a color display. The rendering application is further configured to identify a names array in a color definition of the DeviceN color space of the electronic document, compare the names array to the ICC profiles (or colorant names included therein) stored in the memory device to identify an ICC profile from the plurality of profiles, and (iii) use the identified ICC profile to map the DeviceN color space into control values for the color display.

20 Claims, 5 Drawing Sheets

SYSTEM AND METHOD FOR IMPROVING COLOR MANAGEMENT OF COLOR SPACES IN ELECTRONIC DOCUMENTS

CROSS-REFERENCE TO RELATED APPLICATION

This application claims the benefit pursuant to 35 U.S.C. §119(e) of U.S. provisional application Ser. No. 61/321,469, filed Apr. 6, 2010, which application is specifically incorporated herein, in its entirety, by reference.

COPYRIGHT NOTICE

This patent document contains material subject to copyright protection. The copyright owner has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention relates to color management in an electronic document or, more particularly, to a system and method for improved color management of DeviceN color spaces in an electronic document.

2. Description of Related Art

Color Spaces and DeviceN Color

Color is a psycho-physical process, which is primarily dependent upon the optics of the eye, the spectral sensitivity of the cones in the retina, and the processing neurons in the eye and brain. To enable color comparisons and communication, the Commission Internationale de l'Eclairage (CIE) has defined methods for color quantification. Since the human visual system contains three types of cones, each with a different spectral sensitivity, a color can be quantified using three numbers. The CIE has defined several different "color spaces," each of which have their advantages and disadvantages. However, there are nonsingular transformations between these color spaces, which is to say that a color can be mapped from one to another uniquely. In the CIEXYZ color space, a color is defined by a three element vector, which is usually referred to as a CIEXYZ tristimulus value. Such a value can be mapped to the CIELAB color space, which results in three numbers consisting of a luminance component (L*) and two chrominance components (a* and b*).

There are many different techniques for color reproduction for print and for soft-copy display. Most print applications rely upon three to four primary colorants that typically consist of cyan, magenta, yellow and often black. Depending upon the exact printing technology, a large number of different colors are created using these primaries through what is referred to as a subtractive color process. For example, if the paper is illuminated by a white light, green is achieved through the overlap of the cyan and yellow colorants. The cyan colorant subtracts red while the yellow colorant subtracts blue leaving only green for the observer (since a white light minus blue and red will appear green). The colorants used for printing can be said to define a color space. In the cyan, magenta, yellow and black case, the color space is referred to as CMYK. Note that this CMYK color space is NOT like the CIE color spaces, since there are four numbers that define a color here but there were three numbers for the CIE color spaces. In addition, the CMYK color space cannot create all the colors that are defined in the CIE color space. The set of colors that the CMYK color space can create is referred to as the gamut of the color space. Colors that the CMYK color space cannot create are defined to be out-of-gamut.

Occasionally in print applications, colorants other than the traditional four colorants are used. Motivations for this include (1) the extra colorants can be used to increase the gamut of the printing process, (2) the extra colorants can be used to achieve a particular color for an organization logo or artwork, and (3) the extra colorants can be used to reduce ink usage (e.g., the use of a green colorant in place of overlapping cyan and yellow colorants).

Because of their non-standard use and the large number of possible combinations, printing processes that use multiple non-standard colorants (or one or more nonstandard colorants mixed with standard colorants) are referred to as operating in an N-color or DeviceN color space. We will refer to such a color space as a DeviceN color space.

When multiple colorants are used, the interactions of these colorants can be complex and difficult to predict. In several electronic document formats, there exist methods for defining a color in terms of a DeviceN color.

Page Description Languages

Page description languages (PDLs) are digital file formats that are used to define how a document should be drawn. For example, in a PDL there can be commands to draw a line of a particular thickness and color or to fill a closed path with a particular color. The process of taking those commands and executing them to actually "draw" is called "rendering." Ghostscript™ is a product of Artifex Software™ that renders a number of different PDLs including the well known PostScript and PDF formats.

Adobe introduced PostScript in 1984. It was not until 1997 that PostScript Level 3 was specified with the inclusion of a DeviceN color space. The DeviceN color space in PostScript is defined as follows:

```
[/DeviceN names alternativeSpace tintTransform]
    setcolorspace
```

Where /DeviceN is the keyword that indicates the type of color space that is to be "set" and setcolorspace is the command to set the color space. The parameters names, alternativeSpace and tintTransform provide information about the DeviceN color space. The names parameter is a list of names associated with each of the colorants in the color space. For example, names could be [/Cyan /Orange /ArtifexBlue]. The alternativeSpace parameter is an alternate color space to which the DeviceN color values should be mapped to if the output device does not natively display with Cyan, Orange and ArtifexBlue. This would be true for example if we were viewing the file on an LCD. The alternativeSpace could be a Gray, RGB (Red, Green, Blue), CMYK or a CIE based color space. The tintTranform parameter is a functional mapping that describes how to map a value in the DeviceN color space to the alternate color space. One problem with this approach, is that a printing process with Cyan, Orange and ArtifexBlue (or any combination of N colorants) can be very difficult to express with a functional mapping like is often used with the tintTransform. In addition, most output devices today define how to produce color through the use of ICC profiles. The format used by the ICC profile for defining color mappings is much different than the functional mappings often used by a tintTransform.

Adobe introduced the Portable Document Format (PDF) in 1993. In 1999, with the release of PDF 1.3 the DeviceN color space was introduced. The format for the DeviceN color space in PDF was very similar to the definition for PostScript and is defined as follows:

[/DeviceN names alternativeSpace tintTransform attributes]

Where attributes is a new optional parameter. The attributes parameter can be used to provide additional information about how the colorants behave individually as well as provide suggestions on how they should be mathematically mixed. A problem is that this approach is not really sufficient to provide a highly accurate proofing preview of how the final print will appear when printed. Due to the highly nonlinear nature of most printing processes as well as the human visual system an approach that includes the CIE color spaces and a flexible mapping approach is needed for this problem.

ICC Profiles

In 1993, an industry group called the International Color Consortium (ICC) was founded. Its purpose was to define an industry standard to enable the accurate communication of colors between scanners, cameras, displays and printers. The organization provided a specification for a format called an ICC profile. An ICC profile can be used to define a mapping between the values recorded by a device (e.g. camera/scanner RGB values) and a CIE color space (e.g. CIELAB). An ICC profile can also be used to define a mapping between a CIELAB color space and the control values needed to create those CIE colors on a LCD display or a color printer. Since the founding of the ICC, there have been several revisions to the ICC profile format. In addition, in 1999 when Adobe released the PDF 1.3 specification that included DeviceN colors they also specified support for ICC profiles. A restriction was placed on the allowable profiles however, in that they were only defined for Gray, RGB, or CMYK colors spaces. It was not possible to use an ICC profile to define color for a DeviceN color space that included [/Cyan /Magenta /Yellow /Orange /ArtifexBlue] for example. Instead, PDF relied upon the less accurate tintTransform operation to perform color mapping of DeviceN colors. Adobe never included ICC profiles in the PostScript format. Therefore, PostScript also still relies upon the tintTransform operation to manage DeviceN colors.

SUMMARY OF THE INVENTION

The present invention provides a system and method for improving color management of DeviceN color spaces in an electronic document. Preferred embodiments of the present invention operate in accordance with a memory device and a rendering application operating on a computer, wherein the rendering application is in communication with the memory device and an electronic document that includes at least one DeviceN color space.

In one embodiment of the present invention, the system includes a memory device for storing a plurality of profiles, and a rendering application operating on a computer, wherein each profile includes (or is associated with) a plurality of colorant names and an order in which they are laid down during a reproduction (or printing) process. The rendering application is configured to render an electronic document (e.g., PostScript, PDF, etc.) so that it can be either displayed (as a soft-copy) on a color display, or reproduced by a color printer, wherein the electronic document includes at least one DeviceN color space. The rendering application is further configured to (i) identify a names array in a color definition of the DeviceN color space of the electronic document, (ii) compare the names array to the profiles (or colorant names included therein) stored in the memory device to identify a corresponding profile, and (iii) use the identified profile to map the DeviceN color space into control values for either the display or the printer (i.e., output device), depending on the current operation. This can be done by using the identified profile to map the DeviceN color space to an interchange color space, and using an ICC profile for the output device to map the interchange color space to the control values. In the alternative, the selected profile and the ICC profile for the output device can be merged (or used together) to create a different (e.g., merged) profile that can be used to map the DeviceN color space directly to the control values.

In another embodiment of the present invention, a method is used for improving color management of DeviceN color spaces in an electronic document. The method may include the steps of (i) generating a plurality of profiles, wherein each profile includes (e.g., in at least one tag included in the profile, in at least one flag associated with the profile, etc.) a plurality of colorants and an order in which they are laid down during printing, (ii) storing the profiles in memory, and (iii) in response to a request to render an electroic document having at least one DeviceN color space, identifying a names array of the DeviceN color space. The names array is then compared to the colorants stored in memory to identify a particular profile that can be used to map the DeviceN color space (either directly or indirectly) to control values for an output device, such as a display.

A more complete understanding of a system and method for improved color management of DeviceN color spaces in an electronic document will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

Figure 1:
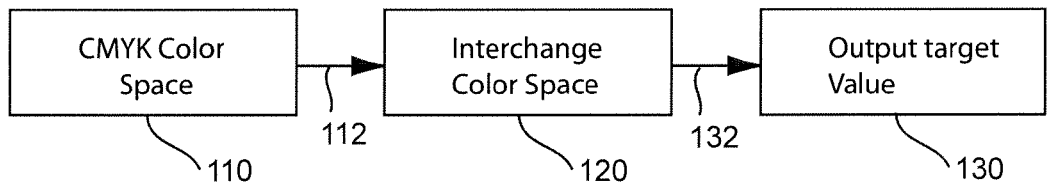
FIG. 1 illustrates a prior art method of mapping a CMYK color space into target values for an output device.

The present invention provides a system and method for improving color management of DeviceN color spaces in an electronic document. In the detailed description that follows, like element numerals are used to describe like elements illustrated in one or more figures.

To provide improved color management of DeviceN colors within PostScript and PDF documents, Artifex™ has invented a novel solution that involves associating the DeviceN color spaces within a document with specific ICC profiles. The ICC profile replaces the alternate tint transform contained within the document. In this case, the ICC profile defines how the DeviceN color descriptors should be mapped to a CIE color space. When this ICC profile is combined with the ICC profile for the display device, which maps from the CIE color space to the display device control values, extremely accurate color reproduction is possible. In addition, it is possible to achieve accurate pre-press proofing to observe through a soft-copy LCD display how the output will appear when reproduced on a particular printer.

Note that a single PDF or PostScript document can contain a number of different DeviceN color spaces. In many cases, it may be desired to relate each of these to a particular ICC profile. This is done through a comparison of the names array in the /DeviceN color definition with a list of colorant names stored in the ICC profile.

The first step to making this all work is to create the ICC profile for the /DeviceN color space. In detail, the process works as follows. The first step is to print with the target printer, overprints of various colorant amounts with the DeviceN colorants. Next, these printed samples are measured with a colorimeter or a spectrophotometer. From these measurements it is possible to create a multi-dimensional look up table that maps from the DeviceN control values to a CIE color space. Artifex™ currently has created a tool for this process. This table is inserted into the ICC profile in a manner defined in the ICC specification. Next, it is necessary to store in a private tag of the ICC profile or using a currently defined ICC profile format tag, the names of the colorants for which this profile is associated. The order of the names relates to the lay-down order of the colorants, since that does affect the final printed color. These names should match the names in the DeviceN names parameter. Finally, the ICC profile is created and stored with all of its required tags.

The ICC profiles are then supplied to the rendering code, e.g. Ghostscript™. The profiles can be stored in an array or in a link list or similar structures. When the rendering code encounters a DeviceN color space, it will step through the array of profiles comparing the DeviceN names parameter with the list of colorant names stored in each of the profiles in the list. If it encounters a match, it will associate any colors that are defined to be in this DeviceN color space with the ICC profile that it found. Recall that this ICC profile provides a mapping from the DeviceN color space to a CIE color space. The rendering code also has an ICC profile for the final output device (e.g. an LCD display), which maps from a CIE color space to the control values of the output device. This output profile is merged with the DeviceN profile to create a mapping from the DeviceN color values to the output device control values. Since both mappings are well defined in terms of a CIE color space, a highly accurate reproduction is possible. In practice, this is rarely achieved if the PostScript or PDF internal tintTransform operation is used.

To summarize, the primary steps are (1) creating ICC profile(s) that includes the colorant names in the order that they are laid down during the reproduction process, (2) providing the ICC profile(s) to the rendering program, (3) matching the ICC profile(s) with the names array in the DeviceN color space(s) and (4) overriding the DeviceN color space(s) tintTransform operations with the ICC profile(s).

Figure 6:
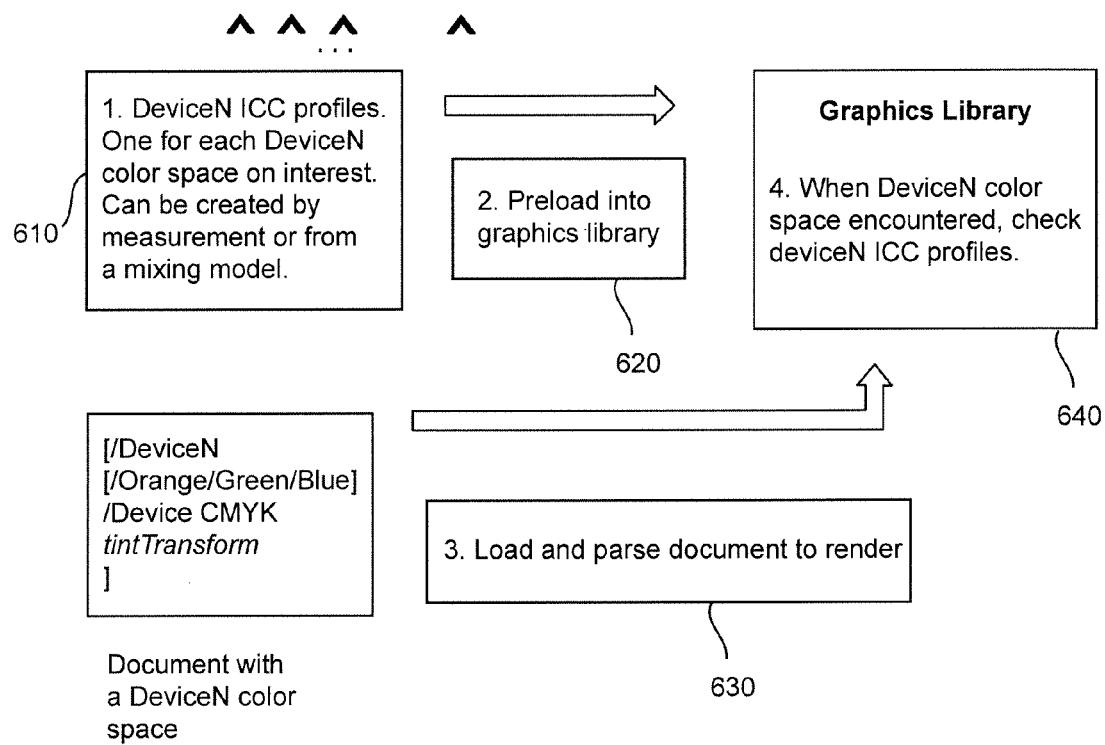
FIG. 6 illustrates, in accordance with one embodiment of the present invention, a method for generating and using a profile to map a DeviceN color space into target values for an output device.
Figure 7:
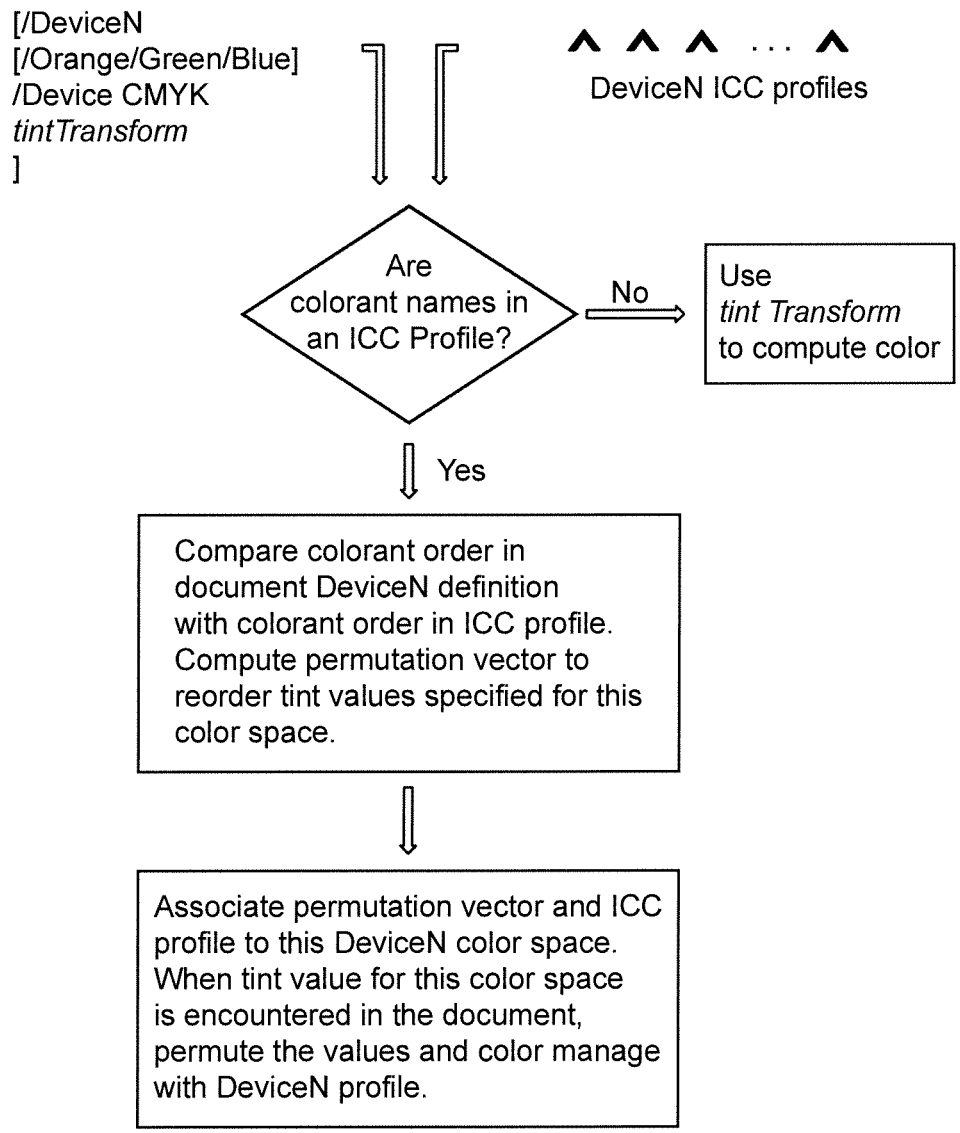
FIG. 7 illustrates, in accordance with one embodiment of the present invention, a method for associating a particular profile with an electronic document's DeviceN color space.

FIGS. 6 and 7 provide a graphical overview of the process that takes place. FIG. 6 indicates, at step 610, that the ICC profiles are first created. This process occurs externally, typically using a commercially available program for creating ICC profiles. As part of this creation, the color names in their proper lay down order must be stored in the ICC profile. This can be done through the use of a private tag in the ICC profile or by using the ColorantTableTag in the ICC profile format. For example, if the colorants were laid down upon the media (e.g. paper) in an order that was first Purple, then Orange and then Green, then the ink names would be stored in an array in the ICC profile in the order Purple, Orange and Green. In step 620, these profiles are loaded into the Graphics Library. Pointers to the profiles are stored in a linked list within an object called the ICC manager that exists in the Graphics Library. The ICC Manager is itself pointed to by a member variable of the Graphics Library imager state, which is accessible in much of the Graphics Library. Code segments for storing the DeviceN ICC profiles in the ICC Manager are given below.

Upon an attempt to set a DeviceN ICC profile in the ICC Manager's linked list, a check is made to see if this profile is already in the linked list using

```
/* We need to do a special check for DeviceN since we have
     a linked list of profiles */
if ( defaulttype == DEVICEN_TYPE ) {
     gsicc_devicen_entry_t *current_entry =
     icc_manager->device_n->head;
     for ( k = 0; k < icc_manager->device_n->count; k++ ) {
          if ( current_entry->iccprofile != NULL ) {
               icc_profile = current_entry->iccprofile;
               if ( namelen == icc_profile->name_length )
                    if( memcmp(pname, icc_profile->name, namelen) ==
                    0)
                         return 0;
          }
          current_entry = current_entry->next;
     }
}
```

If it is determined that the profile is not in the list, then it is added into the linked list of DeviceN ICC profiles. In addition, the colorant names are extracted from the profile and stored in a member variable of the ICC profile object used by the graphics library. That extraction is performed using the following functions.

```
/* Structures used for linked list of colorant names */
typedef struct gsicc_colorname_s gsicc_colorname_t;
struct gsicc_colorname_s {
     char *name;
     int length;
     gsicc_colorname_t *next;
};
typedef struct gsicc_namelist_s gsicc_namelist_t;
```

-continued

```
struct gsicc_namelist_s {
    int count;
    gsicc_colorname_t *head;
};
/* Head function to populate colorant names in a new DeviceN ICC profile */
static void
gsicc_get_devicen_names(cmm_profile_t *icc_profile, gs_memory_t *memory)
{
    /* The names are contained in named color tag. Use the CMM to extract
            the data from the profile */
    if (icc_profile->profile_handle == NULL) {
        if (icc_profile->buffer != NULL) {
            icc_profile->profile_handle =
                    gsicc_get_profile_handle_buffer(icc_profile->buffer);
        } else
            return;
    }
    icc_profile->spotnames = gsicc_get_spotnames(icc_profile->profile_handle,
                            memory);
    return;
}
/* Allocate space for the names and add them */
static gsicc_namelist_t*
gsicc_get_spotnames(gcmmhprofile_t profile, gs_memory_t *memory)
{
    int k;
    gsicc_namelist_t *list;
    gsicc_colorname_t *name;
    gsicc_colorname_t **curr_entry;
    int num_colors;
    char *clr_name;
    /* Get the number of colorants */
    num_colors = gscms_get_numberclrtnames(profile);
    if (num_colors == 0)
        return(NULL);
    /* Allocate structure for managing this */
    list = gsicc_new_namelist(memory);
    if (list == NULL)
        return(NULL);
    curr_entry = &(list->head);
    for (k = 0; k < num_colors; k++) {
        /* Allocate a new name object */
        name = gsicc_new_colorname(memory);
        *curr_entry = name;
        /* Get the name */
        clr_name = gscms_get_clrtname(profile, k);
        gsicc_copy_colorname(clr_name, *curr_entry, memory);
        curr_entry = &((*curr_entry)->next);
    }
    list->count = num_colors;
    return(list);
}
/* The following three functions are the supporting functions for the above
    operation */
/* Allocate new spot name list object. A linked list of names. */
static gsicc_namelist_t*
gsicc_new_namelist(gs_memory_t *memory)
{
    gsicc_namelist_t *result;
    result = gs_alloc_struct(memory,gsicc_namelist_t,
                    &st_gsicc_namelist, "gsicc_new_namelist");
    result->count = 0;
    result->head = NULL;
    return(result);
}
/* Allocate new spot name. */
static gsicc_colorname_t*
gsicc_new_colorname(gs_memory_t *memory)
{
    gsicc_colorname_t *result;
    result = gs_alloc_struct(memory,gsicc_colorname_t,
                    &st_gsicc_colorname, "gsicc_new_colorname");
    result->length = 0;
    result->name = NULL;
    result->next = NULL;
    return(result);
}
/* Copy the name from the CMM dependent stucture to ours */
void
gsicc_copy_colorname( const char *cmm_name, gsicc_colorname_t *colorname,
```

```
gs_memory_t *memory )
{
    int length;
    length = strlen(cmm_name);
    colorname->name = (char*) gs_alloc_bytes(memory, length,
                                "gsicc_copy_colorname");
    strcpy(colorname->name, cmm_name);
    colorname->length = length;
}
```

The functions gscms_get_clrtname and gscms_get_numberclrtnames interface to the color management module to extract a particular colorant name from the ICC profile and get the number of colorant names stored in the profile respectively.

Continuing in FIG. 6, after a PDF or PS document has been loaded and parsed at step 630, and when a DeviceN color space is encountered in the document at step 640, the Graphics Library will install a DeviceN color space. The Graphics Library will then check to see if there is a match in colorant names with the DeviceN ICC profiles in the ICC manager. The match can either be with or without respect to the order in which the colorant names are listed.

Specifically, upon encountering a DeviceN color space within a PDF or PS document, the following code includes a call (gsicc_finddevicen) to check if an appropriate DeviceN ICC profile is present in the ICC Manager. If it does not find a match then no ICC profile is associated with the DeviceN color space.

```
/* Install a DeviceN color space. */
static int
gx_install_DeviceN(gs_color_space * pcs, gs_state * pgs)
{
    int code;
    code = check_DeviceN_component_names(pcs, pgs);
    if (code < 0)
        return code;
    /* See if we have an ICC profile that we can associate with
        this DeviceN color space */
    if (pgs->icc_manager->device_n != NULL) {
        /* An nclr profile is in the manager. Grab one that matches */
        pcs->cmm_icc_profile_data =
            gsicc_finddevicen(pcs, pgs->icc_manager);
        if (pcs->cmm_icc_profile_data != NULL)
            rc_adjust(pcs->cmm_icc_profile_data,
                pcs->rc.ref_count,
                        "gs_install_DeviceN");
    }
    /* {csrc} was
    pgs->color_space->params.device_n.use_alt_cspace */
    ((gs_color_space *)pcs)->params.device_n.use_alt_cspace =
                using_alt_color_space(pgs);
    if (pcs->params.device_n.use_alt_cspace &&
                    pcs->cmm_icc_profile_data == NULL ) {
        /* No nclr ICC profile */
        code = (pcs->base_space->type->install_cspace)
                (pcs->base_space, pgs);
    } else if (pcs->params.device_n.use_alt_cspace) {
        gs_color_space *nclr_pcs;
        /* Need to install with the ICC profile that we found */
        code = gs_cspace_build_ICC(&nclr_pcs, NULL,
            pgs->memory);
        nclr_pcs->cmm_icc_profile_data =
        pcs->cmm_icc_profile_data;
        rc_increment_cs(nclr_pcs);
        rc_decrement_cs(pcs->base_space, "gx_install_DeviceN");
        pcs->base_space = nclr_pcs;
    }
    return code;
}
```

The actual search for a matching DeviceN profile and computation of the permutation vector to apply to the color tint values is implemented by the following function. This is indicated in FIG. 7 where a check is made to see if the colorant names in any of the ICC profiles match the DeviceN colorant names indicated in the PDF or PS source file.

```
cmm_profile_t*
gsicc_finddevicen(const gs_color_space *pcs, gsicc_manager_t *icc_manager)
{
    int k,j,i;
    gsicc_devicen_entry_t *curr_entry;
    int num_comps;
    const gs_separation_name *names = pcs->params.device_n.names;
    unsigned char *pname;
    unsigned int name_size;
    gsicc_devicen_t *devicen_profiles = icc_manager->device_n;
    gsicc_colorname_t *icc_spot_entry;
    int match_count = 0;
    bool permute_needed = false;
    /* Get number of components in DeviceN color space */
    num_comps = gs_color_space_num_components(pcs);
    /* Go through the list of DeviceN profiles looking for a match */
    curr_entry = devicen_profiles->head;
    for ( k = 0; k < devicen_profiles->count; k++ ) {
        if (curr_entry->iccprofile->num_comps == num_comps ) {
            /* Component numbers same. Check Names The order is important
                since this is supposed to be the laydown order.
                If the order is off, the ICC profile will
                not be accurate. The ICC profile drives the laydown
                order here. A permutation vector is used to
```

```
                reorganize the data prior to the transform application */
                for ( j = 0; j < num_comps; j++) {
                        /* Get the character string and length for the
                                component name. */
                        pcs->params.device_n.get_colorname_string(icc_manager->memory,
                                        names[j], &pname, &name_size);
                        /* Compare to the jth entry in the ICC profile */
                        icc_spot_entry = curr_entry->iccprofile->spotnames->head;
                        for ( i = 0; i < num_comps; i++) {
                                if( strncmp((const char *) pname, icc_spot_entry->name,
                                                name_size) == 0 ) {
                                        /* Found a match */
                                        match_count++;
                                        curr_entry->iccprofile->devicen_permute[j] = i;
                                        if ( j != i) {
                                                /* Document ink order does not match ICC profile
                                                        ink order */
                                                permute_needed = true;
                                        }
                                        break;
                                } else
                                        icc_spot_entry = icc_spot_entry->next;
                        }
                        if (match_count < j+1)
                                return(NULL);
                }
                if ( match_count == num_comps) {
                        /* We have a match. Order of components does not match
                                        laydow order specified by the ICC profile. Set a flag. */
                        curr_entry->iccprofile->devicen_permute_needed =
                                                permute_needed;
                        return(curr_entry->iccprofile);
                }
                match_count = 0;
        }
}
return(NULL);}
```

If the above function finds a match, it may also create a permutation vector that is stored in the array iccprofile->devicen_permute. A flag (devicen_permute_needed) is set to indicate if a permuation vector was created. If it was created, the permutation vector will indicate how the tint values should be ordered when they are encountered in the PDF or PS document. If this permutation vector is not created and used and the ink orders in the ICC profile are different than the tint orders as they appear in the PS or PDF document, huge color errors will occur if the profile is used directly on the unpermuted tint values. The actual application of the permutation vector and the profile is performed in the following function

```
static int
gx_remap_DeviceN(const gs_client_color * pcc, const gs_color_space * pcs,
                gx_device_color * pdc, const gs_imager_state * pis, gx_device * dev,
                                gs_color_select_t select)
{
        frac conc[GS_CLIENT_COLOR_MAX_COMPONENTS];
        const gs_color_space *pconcs;
        int i = pcs->type->num_components(pcs),k;
        int code;
        const gs_color_space *pacs = pcs->base_space;
        gs_client_color temp;
        if ( pcs->cmm_icc_profile_data != NULL &&
                                pis->color_component_map.use_alt_cspace) {
                /* If needed, reorganize the data. The ICC colorants tag drives the
                        the laydown order */
                if (pcs->cmm_icc_profile_data->devicen_permute_needed) {
                        for ( k = 0; k < i; k++) {
                                temp.paint.values[k] =
                                                pcc->paint.values[pcs->
                                                        cmm_icc_profile_data->devicen_permute[k]];
                        }
                        code = pacs->type->remap_color(&temp, pacs,
                                                pdc, pis, dev, select);
                } else {
                        code = pacs->type->remap_color(pcc, pacs, pdc, pis, dev, select);
                }
                return(code);
        } else {
```

```
        code = (*pcs->type->concretize_color)(pcc, pcs, conc, pis);
        if code < 0)
            return code;
        pconcs = cs_concrete_space(pcs, pis);
        code = (*pconcs->type->remap_concrete_color)(conc, pconcs, pdc, pis,
                                                    dev, select);
        /* Save original color space and color info into dev color */
        i = any_abs(i);
        for (i--; i >= 0; i--)
            pdc->ccolor.paint.values[i] = pcc->paint.values[i];
        pdc->ccolor_valid = true;
        return code;
    }
}
```

In this code, if it finds that that there is a profile present (i.e. if pcs->cmm_icc_profile_data !=NULL) and we should not keep the data in the DeviceN color space (i.e. if pis->color_component_map.use_alt_cspace is true), then a check is made to see if we need to apply a permutation to the tint values (if (pcs->cmm_icc_profile_data->devicen_permute_needed)). If yes, then the tint values are reordered. The remap operation will then apply the ICC profile to the reordered DeviceN tint values mapping to the colorant values on the actual output device.

As discussed above, ICC profiles are commonly used to map standard colorants (e.g., gray, RGB, CMYK, etc.) to an interchange color space (e.g., CIE color space), and vice versa. This can be seen in FIG. 1, wheren a first ICC profile 112 is used to map a CMYK color space 110 to an interchange color space 120, and a second ICC profile 132 is used to map an interchange color space 120 to output target values 120, or a target value(s) for an output device (e.g., RGB display, etc.). Such a method allows the CMYK color space to be accurately reproduced on the output device.

Figure 2:
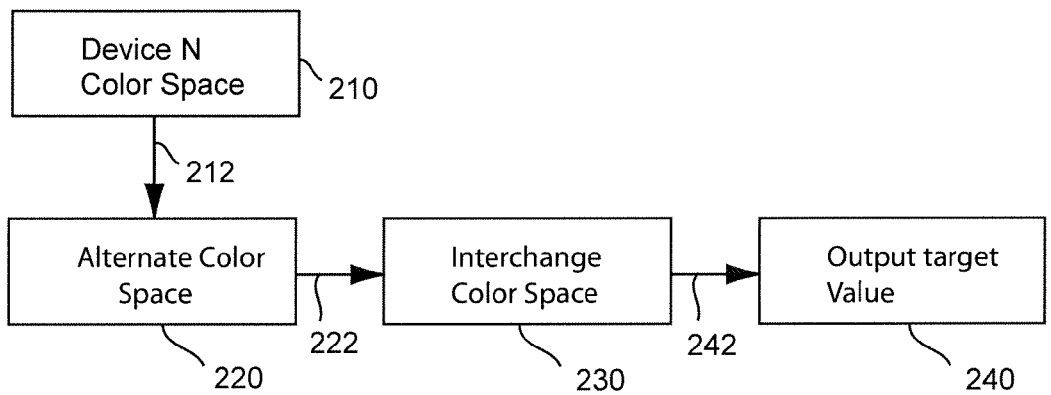
FIG. 2 illustrates a prior art method of mapping a DeviceN color space into target values for an output device.

FIG. 2 is distinguishale from FIG. 1 in that a non-standard colorant (i.e., DeviceN color space) is being mapped to an interchange color space. Specifically, an alternate tint transform 212 is used to map the DeviceN color space 210 to a standard colorant 220. A first ICC profile 222 is then used to map the standard colorant 220 to a interchange color space 230, and a second ICC profile 242 to map the interchange color space 230 to output target values 240. As previously discussed, because of the imprecise nature of the alternate tint transform, the resulting reproduction is not very accurate.

Figure 3:
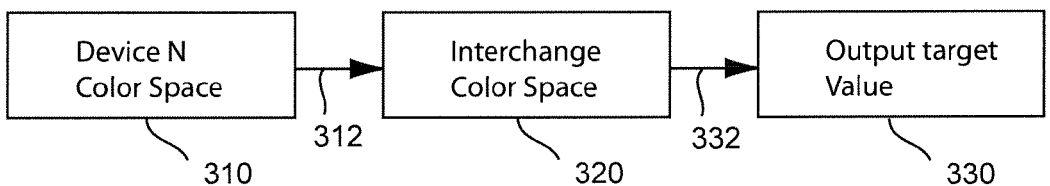
FIG. 3 illustrates, in accordance with one embodiment of the present invention, a system and method of mapping a DeviceN color space into target values for an output device.

The present invention addresses this drawback by identifying an profile (e.g., ICC profile) that can be used to map a DeviceN color space to an interchange color space. The resultant is shown in FIG. 3, where a first ICC profile 312 is used to map a DeviceN color space 310 to an interchange color space 320, and a second ICC profile 332 is used to map an interchange color space 320 to an output target value 330. The key to this process is identifying a profile (e.g., ICC profile) that can be used to map a DeviceN color space to an interchange color space.

Figure 4:
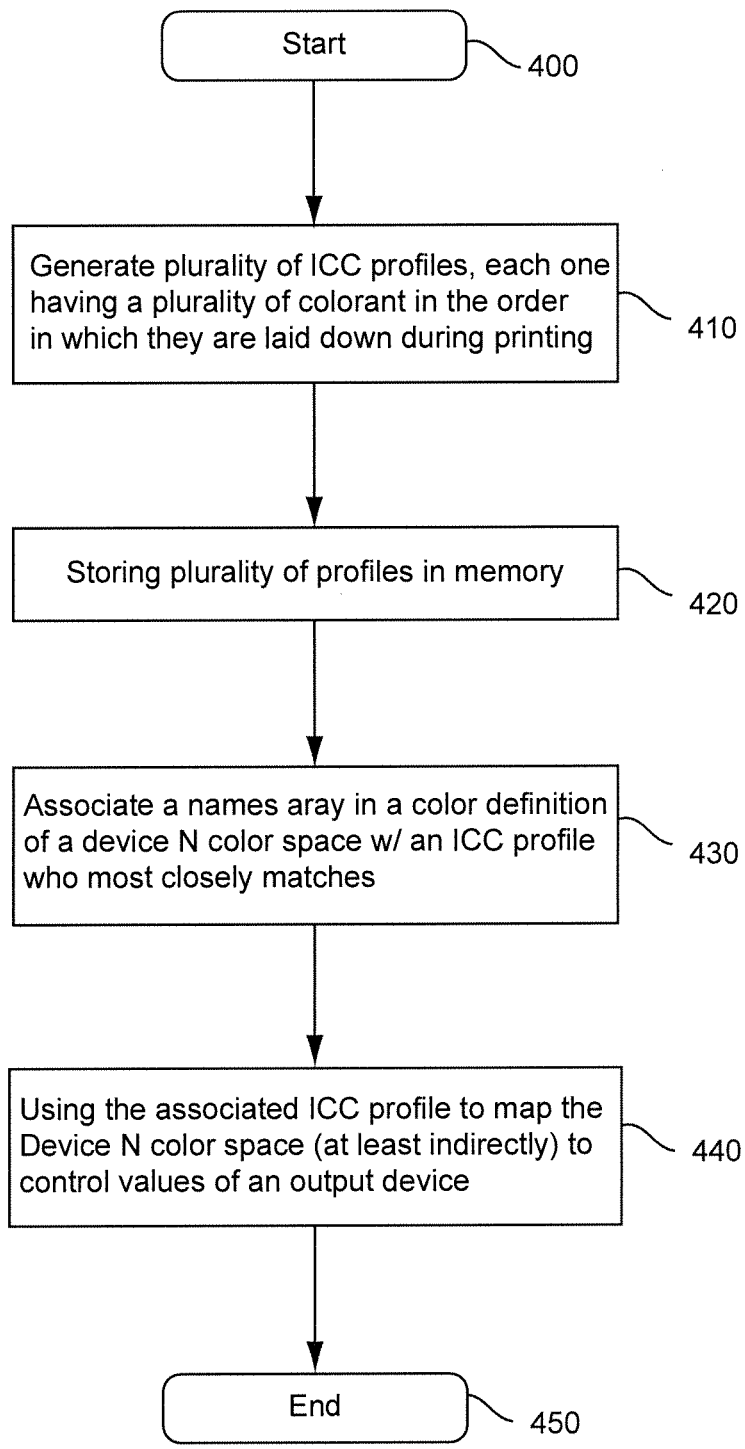
FIG. 4 illustrates, in accordance with one embodiment of the present invention, a method of mapping a DeviceN color space into target values for an output device.

As shown in FIG. 4, this is done by generating a plurality of profiles at step 410, wherein each profile includes (e.g., in at least one tag, etc.) a plurality of colorants in an order in which they are laid down during reproduction. For example, if a profile has been created for a printer having non-standard colorants of Cyan, Orange, and ArtifexBlue (or COA), and the printer is configured to lay these colorants down in the order of ArtifexBlue, Cyan, and Orange, then the profile willl reflect both these non-standard colors, and the order in which they are laid down. This may be done, for example, by listing the non-standard colorants in the order in which they are laid down (i.e., ACO). The profiles are then stored in memory at step 420. At step 430, and, for example, in response to a request to render an electronic document having a DeviceN color space of ArtifexBlue, Cyan, and Orange (or ACO), a rendering application is configured to identify a names array of the DeviceN color space (e.g., ACO), and to use the names array and the colorants stored in the memory (and in certain embodiments the order that the colorants are stored in memory) to identify a corresponding profile. At step 440, the identified profile is then used to map the DeviceN color space to control values for an output device, such as a display. This may be done, for example, by using the identified profile to map the DeviceN color space to an interchange color space, and using an ICC profile for the output device to map the interchange color space to the control value for the output device. By using the same ICC profile to both print and display an electronic document, the displayed soft-copy will accurately represent the printed document.

Figure 5:
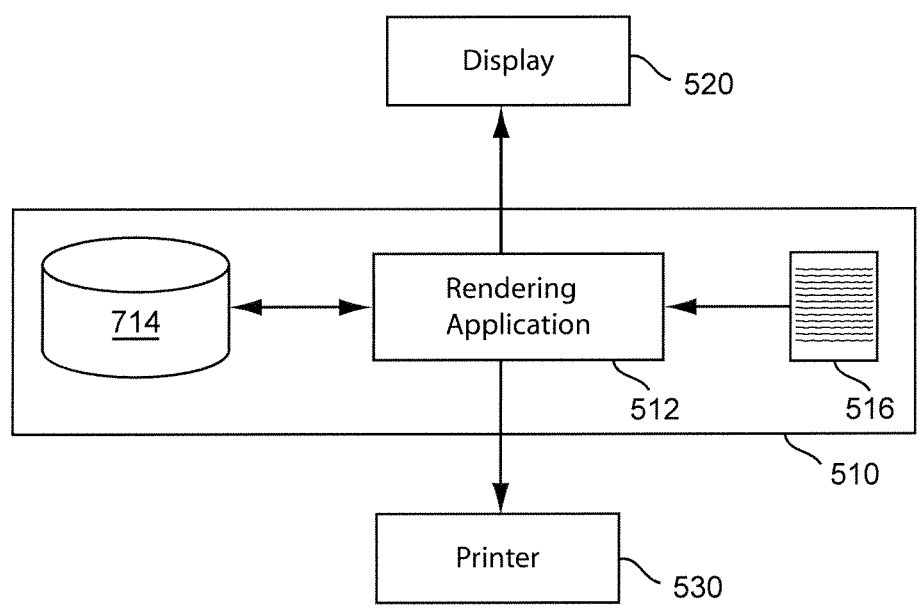
FIG. 5 illustrates, in accordance with one embodiment of the present invention, a system for mapping a DeviceN color space into target values for an output device.

A system for improving color management of a DeviceN color space is shown in FIG. 5. The system includes a memory device 514 for storing a plurality of profiles (e.g., ICC profiles), and a rendering application 512 operating on a computer 510, wherein each profile includes (or is associated with) a plurality of colorant names and/or an order in which they are laid down during a reproduction process. Preferably, each profile includes a different plurality of colorants. For example, a first profile may include cyan, magenta, and yellow, a second profile may include orange, black and ArtifexBlue, and a third profile may include yellow and magenta. The rendering application 512 is configured to render an electronic document 516 so that it can be displayed (as a soft-copy) on a display 520, or reproduced by a printer 530, wherein the electronic document 516 includes at least one DeviceN color space. In doing so, the rendering application 512 is further configured to (i) identify a names array in a color definition of the DeviceN color space of the electronic document 516, (ii) compare the names array to the profiles (or more particularly, each profiles colorant names and/or the order in which they are laid down during reproduction) stored in the memory device 514 to identify (or select) a corresponding profile (e.g., one whose colorant names match the names array (by name and/or order), one whose colorant names most closely matches the names array (by name and/or order), etc.), and (iii) use the identified (or selected) profile to map the DeviceN color space into control values for either the display 520 or the printer 530. This can be done by using the selected profile to map the DeviceN color space to an interchange color space, and using an ICC profile for the output device to map the interchange color space to the control value. This can also be done merging the selected profile and the ICC profile for the output device to create a custom (or merged) profile that can be used to map the DeviceN color space directly to the control values.

Having thus described several embodiments of a system and method for improving color management of DeviceN color spaces in an electronic document, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. An apparatus for accurately displaying an electronic document on a color display, comprising:
    a memory device for storing a plurality of International Color Consortium (ICC) profiles, each one of the plurality of ICC profiles including at least one tag for storing a plurality of colorant names in an order in which the colorant names are laid down during a reproduction process; and
    a rendering application operating on a computer and in communication with the memory device, the application being configured to:
        receive an instruction to display the electronic document on the color display, the electronic document including a DeviceN color space;
        identify a names array in a color definition of the DeviceN color space;
        compare the names array to the plurality of colorant names in each one of the plurality of ICC profiles stored in the memory device;
        select one of the plurality of ICC profiles whose plurality of colorant names match the names array; and
        use the selected one of the plurality of ICC profiles to map, at least indirectly, the DeviceN color space into control values, the control values being used to accurately display the electronic document on the color display.

2. The apparatus of claim 1, wherein the at least one tag stores the plurality of colorant names in an order in which the colorant names are laid down during a printing process.

3. The apparatus of claim 1, wherein the rendering application is further configured to:
    compare the names array to the order in which the plurality of colorant names in each one of the plurality of ICC profiles are laid down during a printing process; and
    select one of the plurality of ICC profiles whose plurality of colorant names and the order in which they are laid down during a printing process matches the names array.

4. The apparatus of claim 1, wherein the names array is included in a page description language (PDL) associated with the electronic document.

5. The apparatus of claim 3, wherein the PDL is one of a PostScript format and a portable document format (PDF).

6. The apparatus of claim 1, wherein the rendering application is further configured to:
    use the selected one of the plurality of ICC profiles to map the DeviceN color space into an interchange color space; and
    use an ICC profile for the color display to map the interchange color space into the control values.

7. The apparatus of claim 6, wherein the interchange color space is a Commission Internationale de l'Eclairage (CIE) color space.

8. The apparatus of claim 1, wherein the rendering application is further configured to:
    merge the selected one of the plurality of ICC profiles with an ICC profile for the color display to create a custom ICC profile; and
    use the custom ICC profile to map the DeviceN color space directly into the control values;
    wherein the selected one of the plurality of ICC profiles is configured to map the DeviceN color space into an interchange color space, and the ICC profile for the color display is configured to map the interchange color space into control values for the color display.

9. The apparatus of claim 8, wherein the interchange color space is a Commission Internationale de l'Eclairage (CIE) color space.

10. A method for accurately displaying an electronic document on a color display, comprising:
    storing a plurality of International Color Consortium (ICC) profiles in a memory device on a computer, each one of the plurality of ICC profiles including a plurality of colorant names in an order in which the colorant names are laid down during a reproduction process;
    receiving an instruction to display the electronic document on the color display, the electronic document including a DeviceN color space;
    identifying by a rendering application operating on the computer a names array in a color definition of the DeviceN color space;
    comparing by the rendering application the names array to the plurality of colorant names in each one of the plurality of ICC profiles stored in the memory device;
    selecting one of the plurality of ICC profiles whose plurality of colorant names most closely matches the names array;
    using the selected one of the plurality of ICC profiles to map, at least indirectly, the DeviceN color space into control values;
    using the control values to accurately display the electronic document on the color display.

11. The method of claim 10, wherein each one of the plurality of ICC profiles includes an order in which the colorant names are laid down during a printing process.

12. The method of claim 11, wherein the steps of comparing the names array to the plurality of colorant names in each one of the plurality of ICC profiles and selecting one of the plurality of ICC profiles whose plurality of colorant names most closely matches the names array further includes:
    comparing the names array to the plurality of colorant names in each one of the plurality of ICC profiles and the order in which the colorant names are laid down during a printing process; and
    selecting one of the plurality of ICC profiles whose plurality of colorant names and order in which they are laid down during a printing process most closely matches the names array.

13. The method of claim 10, wherein the step of identifying a names array in a color definition of the DeviceN color space further comprises identifying the names array from a page description language (PDL) associated with the electronic document.

14. The method of claim 13, wherein the PDL is one of a PostScript format and a portable document format (PDF).

15. The method of claim 10, further comprising the steps of:
    using the selected one of the plurality of ICC profiles to map the DeviceN color space into an interchange color space; and
    using an ICC profile for the color display to map the interchange color space into the control values.

16. The method of claim 10, further comprising the steps of:
- merging the selected one of the plurality of ICC profiles with an ICC profile for the color display to generate a custom ICC profile; and
- using the custom ICC profile to map the DeviceN color space directly into the control values;
- wherein the selected one of the plurality of ICC profiles is adapted to map the DeviceN color space into an interchange color space, and the ICC profile for the color display is adapted to map the interchange color space into control values for the color display.

17. An apparatus for accurately displaying an electronic document on a color display, comprising:
- a memory device for storing a plurality of profiles, each one of the plurality of profiles including a plurality of colorant names in an order in which the colorant names are laid down during a printing process; and
- a rendering application operating on a computer and in communication with the memory device, the application being configured to:
  - identify a names array in a color definition of a DeviceN color space within the electronic document;
  - compare the names array to the plurality of colorant names in each one of the plurality of profiles stored in the memory device;
  - select one of the plurality of profiles whose plurality of colorant names at least substantially matches the names array; and
  - use the selected one of the plurality of profiles to map, at least indirectly, the DeviceN color space into control values, the control values being used to accurately display the electronic document on the color display.

18. The apparatus of claim 17, wherein the names array is included in a page description language (PDL) associated with the electronic document, the PDL being one of a PostScript format and a portable document format (PDF).

19. The apparatus of claim 17, wherein the rendering application is further configured to:
- use the selected one of the plurality of profiles to map the DeviceN color space into an interchange color space; and
- use a profile for the color display to map the interchange color space into the control values.

20. The apparatus of claim 17, wherein the rendering application is further configured to:
- merge the selected one of the plurality of profiles with a profile for the color display to create a custom profile; and
- use the custom profile to map the DeviceN color space directly into the control values;
- wherein the selected one of the plurality of profiles is associated with the mapping of the DeviceN color space to an interchange color space, and the profile for the color display is associated with the mapping of the interchange color space to control values for the color display.

* * * * *